United States Patent [19]

Numoto et al.

[11] Patent Number: 5,492,667
[45] Date of Patent: Feb. 20, 1996

[54] PROCESS FOR PRODUCING A CATALYST ELEMENT

[75] Inventors: Hironao Numoto, Ikoma; Tetsuo Terashima, Neyagawa, both of Japan

[73] Assignee: Matsushita Electric Industrial Co., Ltd., Osaka, Japan

[21] Appl. No.: 375,280

[22] Filed: Jan. 19, 1995

Related U.S. Application Data

[63] Continuation of Ser. No. 24,167, Feb. 22, 1993, abandoned.

[30] Foreign Application Priority Data

Feb. 26, 1992 [JP] Japan .................................. 4-039083
May 22, 1992 [JP] Japan .................................. 4-130403

[51] Int. Cl.$^6$ ................................................. B29C 71/00
[52] U.S. Cl. .......................... 264/234; 264/339; 427/299; 427/372.2
[58] Field of Search ................................... 264/62, 60, 61, 264/63, 257, 263, 234, 339; 427/180, 190, 299, 376.1, 376.2, 372.2

[56] References Cited

U.S. PATENT DOCUMENTS 2,977,265  3/1961  Forsberg et al. ..................... 264/257
4,092,194  5/1978  Green ..................................... 156/89
5,158,448  10/1992  Kawasaki et al. ..................... 431/74

OTHER PUBLICATIONS

Brady et al. Materials Handbook, 12th Ed. McGraw Hill 1986.

Primary Examiner—Christopher A. Fiorilla
Attorney, Agent, or Firm—Stevens, Davis, Miller & Mosher

[57] ABSTRACT

A process for producing a catalyst element including fixing a ceramic sheet to a jig or mold having a predetermined configuration, and thereafter, impregnating the ceramic sheet with a catalyst solution, drying and calcining to allow a catalyst element to retain the predetermined configuration or the catalyst element to be fixed in the mold. The catalyst element may be produced by fixing the ceramic sheet to a metallic thin plate, followed by processing into a predetermined configuration.

20 Claims, 4 Drawing Sheets 5,492,667

PROCESS FOR PRODUCING A CATALYST ELEMENT

This application is a continuation of application Ser. No. 08/024,167, filed Feb. 22, 1993 (abandoned).

BACKGROUND OF THE INVENTION

The present invention relates to a process for producing a catalyst element for use in combustion, exhaust gas purification, and the like, as well as for burning gaseous fuels or liquid fuels which are used in irons, steamers, cookers, coffee-percolators, and the like.

DESCRIPTION OF THE RELATED ART

Conventional catalyst elements are produced by processing honeycomb ceramics or ceramic sheets into a predetermined shape in conformity with the application of the elements, coating the shape with a catalyst slurry to produce catalyst supporting ceramics which are fixed in a mold vessel having a predetermined form with adhesives and put to use.

The honeycomb ceramics involve rigorous limitations in appearance and configuration so that they are generally made in circular or square form. Sheets and felts of inorganic fibers are liable to strain or deform their shapes during manufacture thereof, if catalysts are applied after processing the sheet or felts into a predetermined form.

Conventional methods for production of such catalyst elements require multi-stage processing until the catalyst materials are fixed, such that those catalyst bodies deformed in the course of the production cannot be accurately fixed in the mold vessel resulting in most of the catalyst bodies being unaceptable.

SUMMARY OF THE INVENTION

In order to overcome the drawbacks to the conventional methods as described above, an object of the present invention is to provide a process for producing a catalyst element, where ceramic sheets having catalysts supported are produced in desired forms by a series of constructing steps and at the same time they can be fixed at a higher accuracy in the mold vessel as they are.

The present invention provides a process for allowing a catalyst body to have a predetermined shape or for fixing the catalyst body in the mold vessel which is characterized by fixing ceramic sheets on a jig or a mold vessel having a predetermined form, then impregnating the ceramic sheets with a catalyst solution and, drying and heating the impregnated sheets. In another aspect of the present invention, there is provided a process for producing a catalyst element by fixing the ceramic sheets to a metallic thin plate, followed by a bending process into a predetermined shape.

DESCRIPTION OF PREFERRED EMBODIMENTS

The process for producing a catalyst element of the present invention will be illustrated with reference to the Examples hereunder.

Accordingly, it should be understood that we intend to cover by the appended claims all modifications falling in the true spirit and scope of our invention.

EXAMPLE 1

Figure 1:
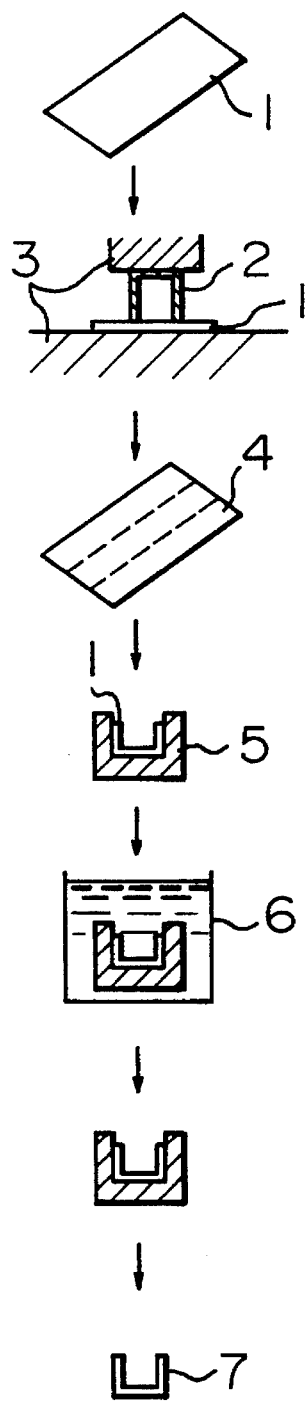
FIG. 1 is a series of major steps of the process for producing the catalyst element as conducted in Example 1 of the present invention.

Referring to FIG. 1, a ceramic sheet 1 (70×30 mm, 1 mm thick) consisting of alumina-silica fibers and an organic binder (about 4 wt %) was pressed with an angular U-type SUS blade 2 (a thickness of 0.5 mm) being forced by a press 3 to produce two notch lines. Then the ceramic sheet was bent into an angular U-type configuration along the two notch lines and engaged into a jig 5 having an angular U-type recess and was thus fixed. Thereafter, the ceramic sheet with the jig was immersed in a wash coating slurry containing 100 g of $Al_2O_3 \cdot CeO_2$ powder (a specific surface area of 120 $m^2/g$), 400 g of water, 40 g of isopropyl alcohol, and an amount of an aqueous solution of platinum dinitrodiamine corresponding to 4 g of platinum, and dried at 80° C. for 20 minutes. The angular U-type ceramic shape was removed from the fixing jig and heat-treated at 500° C. for 20 minutes to produce a catalyst element having 150 mg of $Al_2O_3 \cdot CeO_2$ powder and 6 mg of Pt supported. Consequently, the ceramic shape retained the configuration owing to the bond strength of catalyst supporting particles to some extent of mechanical strength, even after the organic binder was burned out.

The term "ceramic sheet" as used here refers to a sheet type material composing of major heat-resistant inorganic fibers, the thickness of which is not critical so long as it has a plate like configuration. However, in order to perform processing such as folding and bending, an indispensable organic binder should be incorporated preferably to some extent (at least 0.5 wt. %). The catalyst bearing powders such as $Al_2O_3 \cdot CeO_2$ and the like to be supported on the ceramic sheets should preferably be incorporated to achieve a retention of 10 wt. % or more for the purpose of imparting some mechanical strength to the catalyst element.

The present invention enables the processing of catalyst elements at high accuracy in dimensions by simple manufacturing steps from green ceramic sheets containing an organic binder to the final desired shapes of the catalyst elements which can find a wide variety of applications in the catalyst art. Especially, the present invention allows the application to relatively complicated configurations by employing the ceramic sheets containing organic binders which are highly flexible. A higher amount of organic binders leads to a ceramic sheet having a higher flexibility to be compliant to complicated configurations. Furthermore, the processing of ceramic sheets into shapes as being tightly conformed to the predetermined forms of the jigs can be achieved by previously making of notch lines with a press, along which lines the ceramic sheets can be processed to bend or fold at a high accuracy in dimensions into any type of configurations such as angular U-type, chevron-type and the like.

The jig of the predetermined shape may be precoated with viscous wax such as Vaseline or a protective film of polyolefinic polyethylenes as release agents and then the ceramic sheets are fixed on the jig, thereby providing for easy removal of the ceramic sheets having the catalyst supported from the jig after drying. The identical effects may be achieved by fixing the ceramic sheets on the jig with a thin film of Teflon or the like being interposed between therebetween to make the operation after drying easy.

Figure 2:
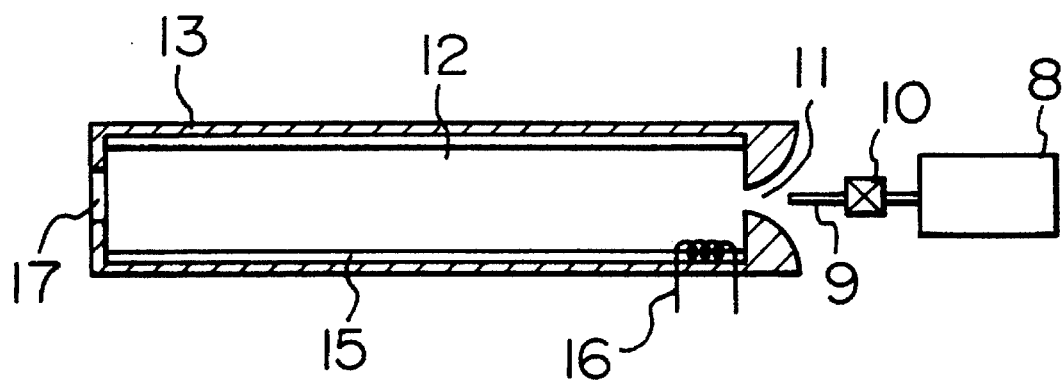
FIG. 2 is a longitudinally cross-sectional view of a combustion apparatus with the catalyst element obtained by the process conducted in one of the Examples of the present invention.
Figure 3:
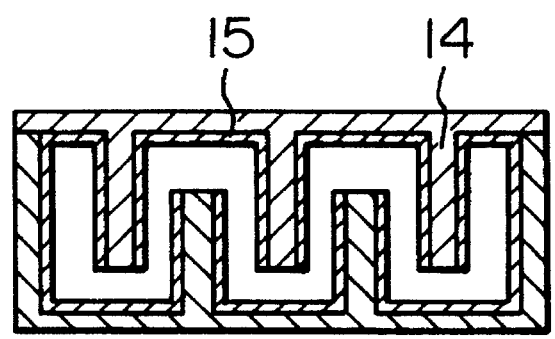
FIG. 3 is a transversely cross-sectional view of a combustion apparatus equipped with the catalyst element obtained by the process conducted in one of the Examples of the present invention.
Figure 4:
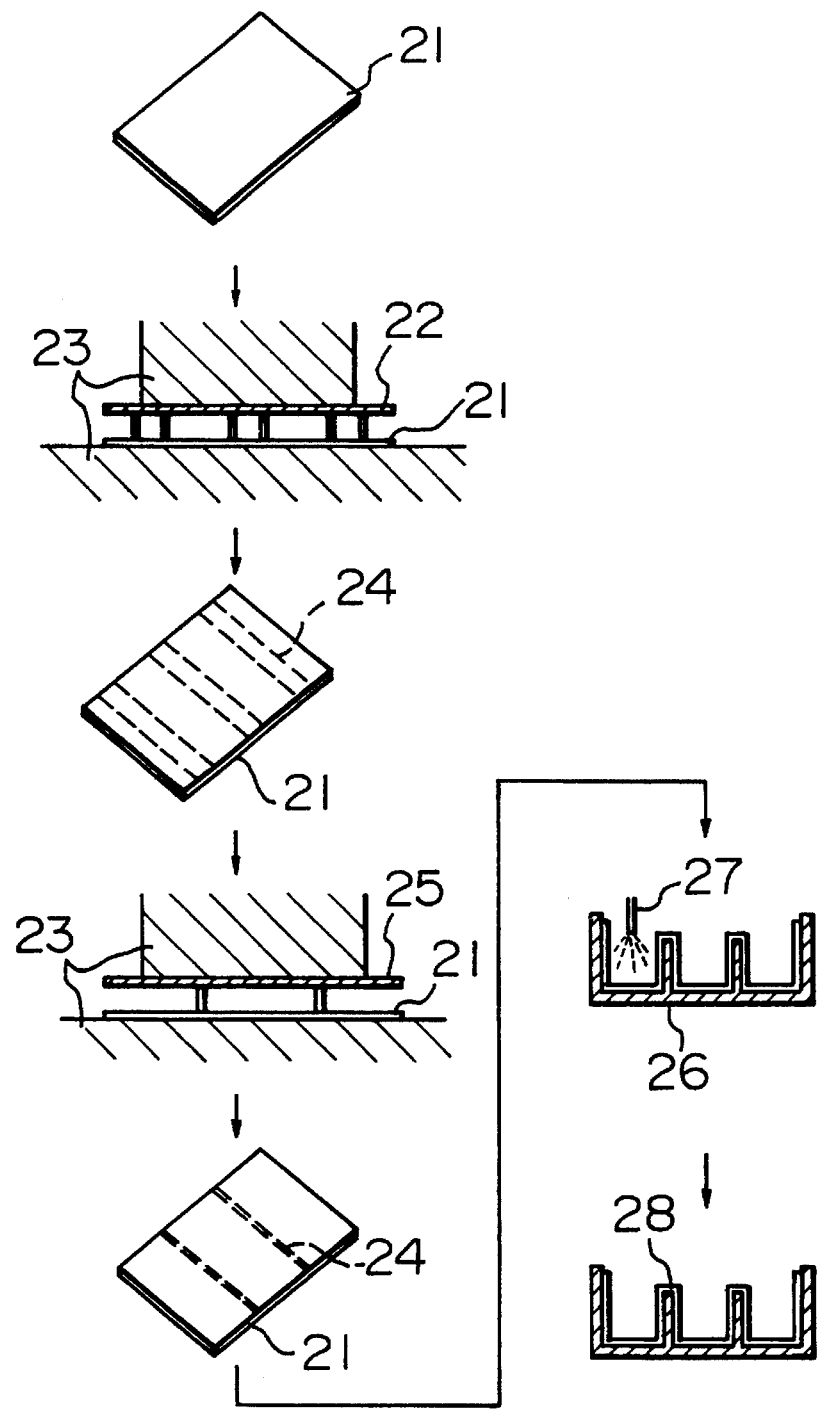
FIG. 4 is a series of major steps of the process for producing the catalyst element as conducted in Example 2 according to the present invention.

Six catalyst elements as described above were used to arrange a combustion apparatus as shown in FIGS. 2 and 3. In FIG. 2, 8 is a isobutane gas cylinder and a valve 10 is disposed between the cylinder 8 and a nozzle 9 to control the flow rate of gaseous fuel supplied from the cylinder 8. The gaseous fuel jetted from the nozzle 9 is mixed uniformly with the ambient air drawn in by suction with the gas flow in a mixing chamber 11 and passes into a combustion chamber 12. The combustion chamber 12 is provided inside a heat radiation enclosure 13 which is a box made of a metal such as aluminum and the like and provided with fins 14 projecting inward from the heat generation enclosure 13. The catalyst element 15 obtained in the example of the present invention is tightly attached onto the surfaces of the inner wall of the combustion chamber 12. Briefly, the principle of operation of the apparatus will be described as follows: First, a heater 16 is actuated to raise the temperature of a part of the catalyst element 15 positioned closely to the heater. When the temperature reaches to a level sufficient to activate the catalyst, the valve 10 is opened to supply the gaseous fuel from the nozzle 9 into the mixing chamber 11 together with air drawn in by suction. The gaseous fuel and the air are introduced into the combustion chamber 12 to commence the catalytic combustion with a part of the catalyst element 15 being activated in the vicinity of the heater 16. The reaction propagates gradually throughout the catalyst element 15 in the combustion chamber 12 with combustion gases being discharged at an outlet 17. The reaction heat is delivered outward partly by the exhaust combustion gases (convection) and partly by transmitting from the surfaces of the inner wall of the combustion chamber 12 in contact with the catalyst element 15 through the metallic box (heat conduction).

With isobutane as fuel, the combution coefficient was evaluated under the conditions of an air rich ratio of 1.05 and 500 kcal/hr. using characteristics of the exhaust gases (HC, CO). As a result, a combution coefficient of not less than 95% was achieved as combution characteristic in the examples of the present invention.

EXAMPLE 2

A ceramic sheet 21 (70×98 mm, 1 mm thick) consisting of alumina-silica fibers and an organic binder (about 5 wt %) was first pressed on one side with a plurality of angular U-type SUS blades 2 (a thickness of 0.4 mm) attached on a support 22 being forced by a press 23 to produce notch lines 24. The ceramic sheet was then pressed on the opposite side with a plurality of blades disposed at predetermined distances on a support 25 being forced by a press 23 to produce notch lines 24. Then the ceramic sheet was bent along the notch lines to be engaged into an aluminum mold 26 having a plurality of channels, e.g., three in this case, and thus fixed. Thereafter, the ceramic shape was impregnated with a wash coating slurry containing 100 g of $Al_2O_3 \cdot CeO_2$ powder (a specific surface area of 120 m$^2$/g), 400 g of water, 40 g of isopropyl alcohol, and an amount of an aqueous solution of platinum dinitrodiamine corresponding to 4 g of platinum applied by an automated spray 27, and dried at 80° C. for 20 minutes and heat-treated at 300° C. to produce a catalyst element having 450 mg of $Al_2O_3 \cdot CeO_2$ powder and 18 mg of Pt supported. Consequently, the ceramic shape retained the configuration with a certain degree of mechanical strength while being fixed inside the mold owing to the bond strength (coagulation force) of catalyst supporting particles even after most of the organic binder was burned out.

Then, another mold having two identical channels and two of half width channels disposed on opposite sides, which mold had a configuration capable of being assembled with the above mold having three channels in a manner as its channels being offset from those of the above mold, was used to produce and fix a catalyst element in the mold in the same procedure as in the above case. The thus produced two catalyst elements formed in the molds were assembled to arrange the similar combustion apparatus to that shown in FIGS. 2 and 3.

The term "ceramic sheet" as used here refers to a sheet type material composed of major heat-resistant inorganic fibers, the thickness of which is not critical so long as it has a plate like configuration. However, in order to perform processing such as folding and bending, an indispensable organic binder should be incorporated preferably to some extent (at least 0.5 wt. %). The catalyst bearing powders such as $Al_2O_3 \cdot CeO_2$ and the like to be supported on the ceramic sheets should preferably be incorporated to achieve a retention of 20 wt. % or more for the purpose of imparting some mechanical strength as well as adhesive strength to the catalyst element with the molds.

The present invention enables the production of catalyst elements from green ceramic sheets containing an organic binder to the final desired shapes of the catalyst elements as well as the fixation of the catalyst elements to the molds at high accuracy. The adhesive fixation of the catalyst elements onto the molds is attributed to the coagulation force of the catalyst bearing particles generated when an excess amount of the catalyst containing slurry in the step of impregnating the ceramic shapes with the slurry is dried and heat-treated. A higher amount of organic binders leads to a ceramic sheet having a higher flexibility to be compliant to complicated configurations, such as configurations having a sequence of the angular U-type channels. Furthermore, the processing of ceramic sheets into shapes as being tightly conformed to the predetermined forms of the jigs can be achieved by previously producing lines of notch with a press, along which lines the ceramic sheets can be processed to bend or fold at a high accuracy in dimensions into any type of configurations such as angular U-type, chevron-type and the like. Moreover, the molds could be pretreated in the regions thereof, on which the ceramic shapes were adhesively fixed, by sand blast, hairline processing, or the like to increase the specific surface area of the molds, whereby the tightness of adhesion could be increased and subsequently when used in combustion apparatuses the catalyst elements were effectively protected from spalling owing to thermal shock.

EXAMPLE 3

Figure 5:
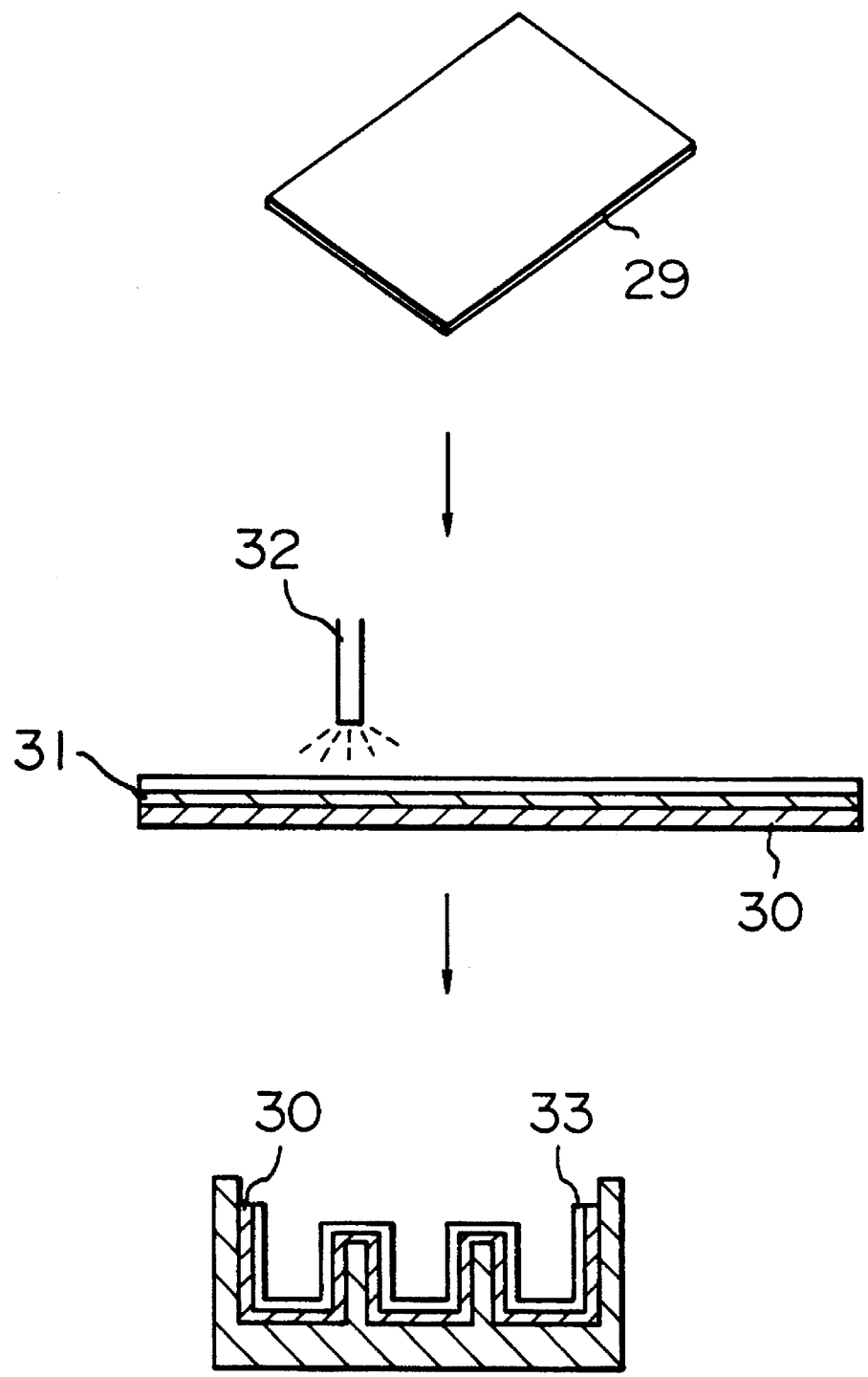
FIG. 5 is a series of major steps of the process for producing the catalyst element as conducted in Example 3 according to the present invention.

A ceramic sheet 29 (70×98 mm, 0.5 mm thick) consisting of alumina-silica fibers and an organic binder (about 4 wt %)

was adhered to an aluminum plate (70×98 mm, 0.1 mm thick) with an inorganic binder 31, dried, and thereafter, impregnated with a wash coating slurry containing 100 g of $Al_2O_3.CeO_2$ powder (a specific surface area of 120 $m^2/g$), 400 g of water, 40 g of isopropyl alcohol, and an amount of an aqueous solution of platinum dinitrodiamine corresponding to 4 g of platinum applied by an automated spray 32, and dried at 80° C. for 20 minutes and heat-treated at 300° C. to produce a catalyst element 33 having 450 mg of $Al_2O_3.CeO_2$ powder and 18 mg of Pt supported. The resultant catalyst element was processed by bending so as to abut to a mold 6 having three channels without any gap therebetween and then fixed to the mold by fixing the aluminum plate to the mold at four sites so that the catalyst element could not be separated from the mold. Briefly, the process of the production is shown in FIG. 5.

Then, another mold having two identical channels and two of half width channels disposed on opposite sides, which mold had a configuration capable of being assembled with the above mold having three channels in a manner as its channels being offset from those of the above mold, was used to produce an another catalyst element having a metallic thin plate adhered thereto in the same procedure as in the above case and fixed the metallic plate onto the mold at four sites. The thus produced two catalyst elements formed in the molds was assembled to arrange the similar combustion apparatus to that shown in FIGS. 2 and 3.

The term "ceramic sheet" as used here refers to a sheet type material composed of major heat-resistant inorganic fibers, the thickness of which is not critical so long as it has a plate like configuration. Since the processing of bending, folding, or the like is effected after the ceramic sheet was adhesively fixed to the metallic thin plate, the production of the catalyst elements could be performed with ceramic sheets containing no organic binders without any disadvantages.

The present invention allows a greater workability to be achieved in processing the ceramic sheets into predetermined shapes by bending them after being adhered to the metallic thin plate as well as a higher speed and higher accuracy to be achieved in bending process. Especially with thin ceramic sheets, in the bending process into the predetermined shapes, the ceramic sheets alone are liable to cause failure such as break down and the like due to lower strength, while a combination thereof with metallic thin plates adhered thereto do not cause any problem for end utility even if any break down generated at bended regions. Moreover, intentional formation of notch lines (cut lines) in the ceramic sheets with blades allowed the sheets to be compliant to complicated configuration.

EXAMPLE 4

A ceramic sheet consisting of alumina-silica fibers and an organic binder (about 4 wt %) was impregnated with a wash coating slurry containing 100 g of $Al_2O_3.CeO_2$ powder (a specific surface area of 120 $m^2/g$), 400 g of water, 40 g of isopropyl alcohol, and an amount of an aqueous solution of platinum dinitrodiamine corresponding to 4 g of platinum, and then placed on an aluminum plate (70×98 mm, 0.1 mm thick), and dried at 80° C. for 20 minutes and heat-treated at 300° C. to produce a catalyst element having 450 mg of $Al_2O_3.CeO_2$ powder and 18 mg of Pt supported where the ceramic sheet was adhered to the aluminum plate with the slurry. The resultant catalyst element was processed by bending so as to abut to a mold having three channels without any gap therebetween and then fixed to the mold by fixing the aluminum plate to the mold at four sites.

Then, another mold having two identical channels and two of half width channels disposed on opposite sides, which mold had a configuration capable of being assembled with the above mold having three channels in a manner as its channels being offset from those of the above mold, was used to produce an another catalyst element having a metallic thin plate adhered thereto in the same procedure as in the above case and fixed the metallic plate onto the mold at four sites. The thus produced two catalyst elements formed in the molds was assembled to arrange the similar combustion apparatus to that shown in FIGS. 2 and 3.

The term "ceramic sheet" as used here refers to a sheet type material composed of major heat-resistant inorganic fibers, the thickness of which is not critical so long as it has a plate like configuration. Since the processing of bending, folding, or the like is effected after the ceramic sheet was adhesively fixed to the metallic thin plate, the production of the catalyst elements could be performed with ceramic sheets containing no organic binders without any disadvantages. The catalyst bearing powders such as $Al_2O_3.CeO_2$ and the like to be supported on the ceramic sheets should preferably be incorporated to achieve a retention of 20 wt. % or more for the purpose of imparting some mechanical strength as well as adhesive strength to the catalyst element with the molds.

The present invention allows a greater workability to be achieved in processing the ceramic sheets into predetermined shapes by bending them after adhered to the metallic thin plate as well as a higher speed and higher accuracy to be achieved in the bending process. Especially with thin ceramic sheets, in the bending process into the predetermined shapes, the ceramic sheets alone are liable to cause failure such as break down and the like due to lower strength, while a combination thereof with metallic thin plates adhered thereto do not cause any problem for end utility even if any break down is generated at bended regions. Moreover, intentional formation of notch lines (cut lines) in the ceramic sheets with blades allowed the sheets to be compliant to complicated configuration. In order to strongly adhere the ceramic sheets to the metallic thin plate by the bond strength with the catalyst slurry, the process where after impregnated with the catalyst slurry the ceramic sheets were placed on an aluminum plate, pressed to some extent, dried and heat-treated was effective. Moreover, the metallic thin plates, to which the ceramic sheets were adhered, could be pretreated by sand blast, hairline processing, etching, or the like to increase the specific surface area thereof, which allowed an increase in the tightness of adhesion and was effective to protect from spalling.

EXAMPLE 5

A ceramic sheet (70×98 mm, 0.5 mm thick) consisting of alumina-silica fibers and an organic binder (about 4 wt %) was impregnated with a wash coating slurry containing 100 g of $Al_2O_3.CeO_2$ powder (a specific surface area of 120 $m^2/g$), 400 g of water, 40 g of isopropyl alcohol, and an amount of an aqueous solution of platinum dinitrodiamine corresponding to 4 g of platinum, and dried at 80° C. for 20 minutes and heat-treated at 300° C. to produce a catalyst element having 450 mg of $Al_2O_3.CeO_2$ powder and 18 mg of Pt supported. The resultant catalyst element was adhered to an aluminum plate (70×98 mm, 0.1 mm thick) with an inorganic adhesive, dried, and processed by bending so as to abut to a mold having three channels without any gap therebetween and then fixed to the mold by fixing the aluminum plate to the mold at four sites.

Then, another mold having two identical channels and two of half width channels disposed on opposite sides, which mold had a configuration capable of being assembled with the above mold having three channels in a manner as its channels being offset from those of the above mold, was used to produce an another catalyst element having a metallic thin plate adhered thereto in the same procedure as in the above case and fixed the metallic plate onto the mold at four sites. The thus produced two catalyst elements formed in the molds were assembled to arrange the similar combustion apparatus to that shown in FIGS. 2 and 3.

The term "ceramic sheet" as used here refers to a sheet type material composed of major heat-resistant inorganic fibers, the thickness of which is not critical so long as it has a plate like configuration. Since the processing of bending, folding, or the like is effected after the ceramic sheet was adhesively fixed to the metallic thin plate, the production of the catalyst elements could be performed with ceramic sheets containing no organic binders without any disadvantages.

The present invention allows a greater workability to be achieved in processing the ceramic sheets into predetermined shapes by bending them after adhered to the metallic thin plate as well as a higher speed and higher accuracy to be achieved in the bending process. Especially with thin ceramic sheets, in the bending process into the predetermined shapes, the ceramic sheets alone are liable to cause failure such as break down and the like due to lower strength, while a combination thereof with metallic thin plates adhered thereto do not cause any problem for end utility even if any break down is generated at bended regions. Moreover, intentional formation of notch lines (cut lines) in the ceramic sheets with blades allowed the sheets to be compliant to complicated configuration.

In Examples 3 to 5, there has been described the use of aluminum plate as metallic thin plate, though other metals such as SUS and the like so long as they are easily handleable thin sheets (i.e., those having a thickness on the order of 50 μm or less can be used). Materials having an excellent heat conductivity such as aluminum and the like permitted achievement of effective heat conduction of the combustion heat generated at the catalyst elements to the mold enclosure. Furthermore, previous formation of notch lines on the aluminum plate at the regions where the aluminum plate was bent allowed good workability in bending process under the conditions that the aluminum plate and the ceramic sheet were adhered to each other.

In the examples, there have been described the cases where the catalyst elements were used for combustion, though the catalyst elements obtained by the present invention can find a wide variety of utility because they can be processed into various configurations.

What is claimed is:

1. A process for producing a catalyst element comprising:
   (a) fixing a ceramic sheet including an organic binder to a jig having a configuration, and
   (b) thereafter, impregnating said ceramic sheet with a slurry consisting essentially of a catalyst support, a liquid, and a catalyst solution consisting essentially of a catalyst and a solvent, and
   (c) drying and calcining the impregnated sheet resulting from step (b) to produce a catalyst element retaining the configuration.

2. The process for producing a catalyst element according to claim 1, wherein step (b) comprises immersing said ceramic sheet in a wash coating slurry comprising 100 g of $Al_2O_3 \cdot CeO_2$ powder, 400 g of water, 40 g of isopropyl alcohol, and an amount of aqueous solution of platinum dinitrodiamine corresponding to 4 g of platinum, and drying the impregnated at 80 degrees C. for 20 minutes.

3. The process for producing a catalyst element according to claim 2, wherein said ceramic sheet comprises at least 0.5 wt % of said organic binder.

4. The process for producing a catalyst element according to claim 1, wherein said ceramic sheet comprises at least 0.5 wt % of said organic binder.

5. The process for producing a catalyst element according to claim 1, wherein the ceramic sheet comprises inorganic fibers and the binder binds the inorganic fibers.

6. A process for producing a catalyst element comprising:
   (a) fixing a ceramic sheet including an organic binder to a mold having a configuration, and
   (b) thereafter, impregnating said ceramic sheet with a slurry consisting essentially of a catalyst support, a liquid, and a catalyst solution consisting essentially of a catalyst and a solvent, and
   (c) drying and heat-treating the impregnated sheet resulting from step (b) to produce a catalyst element retaining the configuration as well as to fix said catalyst in said mold.

7. The process for producing a catalyst element according to claim 6, wherein step (b) comprises immersing said ceramic sheet in a wash coating slurry comprising 100 g of $Al_2O_3 \cdot CeO_2$ powder, 400 g of water, 40 g of isopropyl alcohol, and an amount of aqueous solution of platinum dinitrodiamine corresponding to 4 g of platinum, and drying the impregnated sheet at 80 degrees C. for 20 minutes.

8. The process for producing a catalyst element according to claim 7, wherein said ceramic sheet comprises at least 0.5 wt % of said organic binder.

9. The process for producing a catalyst element according to claim 6, wherein said ceramic sheet comprises at least 0.5 wt % of said organic binder.

10. The process for producing a catalyst element according to claim 6, wherein the ceramic sheet comprises inorganic fibers and the binder binds the inorganic fibers.

11. A process for producing a catalyst element comprising:
    (a) fixing a ceramic sheet including an organic binder to a jig having a configuration, and
    (b) thereafter, impregnating said ceramic sheet with a slurry consisting essentially of a catalyst support, a liquid, and a catalyst solution consisting essentially of a catalyst and a solvent, and
    (c) drying and calcining the impregnated sheet resulting from step (b) to produce a catalyst element retaining the configuration,
    wherein said ceramic sheet is pressed on surfaces thereof to form notch lines, bent along the notch lines, and fixed to the jig having a predetermined configuration in step (a), and thereafter, impregnated with the catalyst solution in step (b), and dried and heat-treated in step (c) to produce the catalyst element retaining the configuration.

12. The process for producing a catalyst element according to claim 11, wherein step (b) comprises immersing said ceramic sheet in a wash coating slurry comprising 100 g of $Al_2O_3 \cdot CeO_2$ powder, 400 g of water, 40 g of isopropyl alcohol, and an amount of aqueous solution of platinum dinitrodiamine corresponding to 4 g of platinum, and drying the impregnated ceramic sheet at 80 degrees C. for 20 minutes.

13. The process for producing a catalyst element according to claim 12, wherein said ceramic sheet comprises at least 0.5 wt % of said organic binder.

14. The process for producing a catalyst element according to claim 11, wherein said ceramic sheet comprises at least 0.5 wt % of said organic binder.

15. The process for producing a catalyst element according to claim 11, wherein the ceramic sheet comprises inorganic fibers and the binder binds the inorganic fibers.

16. A process for producing a catalyst element comprising:
    (a) fixing a ceramic sheet including an organic binder to a mold having a configuration, and
    (b) thereafter, impregnating said ceramic sheet with a slurry consisting essentially of a catalyst support, a liquid, and a catalyst solution consisting essentially of a catalyst and a solvent, and
    (c) drying and heat-treating the impregnated sheet resulting from step (b) to produce a catalyst element retaining the configuration as well as to fix said catalyst in said mold,
    wherein said ceramic sheet is pressed on surfaces thereof to form notch lines, bent along the notch lines, and fixed to said mold in step (a), and thereafter, impregnated with the catalyst solution in step (b), and dried and calcined in step (c) to produce the catalyst element retaining the configuration as well as to fix said catalyst in said mold.

17. The process for producing a catalyst element according to claim 16, wherein step (b) comprises immersing said ceramic sheet in a wash coating slurry comprising 100 g of $Al_2O_3 \cdot CeO_2$ powder, 400 g of water, 40 g of isopropyl alcohol, and an amount of aqueous solution of platinum dinitrodiamine corresponding to 4 g of platinum, and drying the impregnated ceramic sheet at 80 degrees C. for 20 minutes.

18. The process for producing a catalyst element according to claim 17, wherein said ceramic sheet comprises at least 0.5 wt % of said organic binder.

19. The process for producing a catalyst element according to claim 16, wherein said ceramic sheet comprises at least 0.5 wt % of said organic binder.

20. The process for producing a catalyst element according to claim 16, wherein the ceramic sheet comprises inorganic fibers and the binder binds the inorganic fibers.

* * * * *